US008804658B2

(12) United States Patent
Chen et al.

(10) Patent No.: US 8,804,658 B2
(45) Date of Patent: Aug. 12, 2014

(54) METHOD AND APPARATUS FOR HANDOVER BETWEEN IEEE 802.16E AND 802.16M SYSTEMS

(75) Inventors: Yih-Shen Chen, Hsinchu (TW); Chao-Chin Chou, Taipei (TW); I-Kang Fu, Taipei (TW)

(73) Assignee: Mediatek Inc. (TW)

( * ) Notice: Subject to any disclaimer, the term of this patent is extended or adjusted under 35 U.S.C. 154(b) by 1323 days.

(21) Appl. No.: 12/589,374

(22) Filed: Oct. 21, 2009

(65) Prior Publication Data

US 2010/0098025 A1    Apr. 22, 2010

Related U.S. Application Data

(60) Provisional application No. 61/107,407, filed on Oct. 22, 2008.

(51) Int. Cl.
*H04W 4/00* (2009.01)
*H04W 36/00* (2009.01)

(52) U.S. Cl.
USPC .......................................... 370/331; 455/436

(58) Field of Classification Search
USPC ....................................................... 370/331
See application file for complete search history.

(56) References Cited

U.S. PATENT DOCUMENTS

| | | | | |
|---|---|---|---|---|
| 8,145,224 | B2 * | 3/2012 | Cho et al. ....................... | 455/450 |
| 8,175,042 | B2 * | 5/2012 | Oyman et al. ................. | 370/329 |
| 2008/0095195 | A1 * | 4/2008 | Ahmadi et al. ................ | 370/478 |
| 2009/0103569 | A1 * | 4/2009 | Cho et al. ....................... | 370/498 |
| 2009/0116430 | A1 * | 5/2009 | Bonta et al. ................... | 370/329 |
| 2009/0116435 | A1 * | 5/2009 | Koorapaty et al. ........... | 370/329 |
| 2009/0135755 | A1 * | 5/2009 | Qi et al. ......................... | 370/311 |
| 2009/0168745 | A1 * | 7/2009 | Ahmadi et al. ................ | 370/350 |
| 2009/0227255 | A1 * | 9/2009 | Thakare ......................... | 455/434 |
| 2010/0002653 | A1 * | 1/2010 | Agiwal et al. ................. | 370/331 |
| 2010/0098025 | A1 * | 4/2010 | Chen et al. ..................... | 370/331 |
| 2010/0098247 | A1 * | 4/2010 | Suumaki ......................... | 380/44 |

FOREIGN PATENT DOCUMENTS

| | | |
|---|---|---|
| CN | 101252776 A | 8/2008 |
| CN | 101282262 A | 10/2008 |
| EP | 2144464 A2 | 7/2008 |

OTHER PUBLICATIONS

Japan Office Action for JP application 2011-527196 dated Sep. 11, 2012 (10 pages).

Yung-Han Chen et al., Handover Issues in IEEE 802.16m/e Co-existing Systems, IEEE C802.16m-08/586r4, Jul. 15, 2008 (7 pages).

(Continued)

*Primary Examiner* — Gerald Smarth

(74) *Attorney, Agent, or Firm* — Imperium Patent Works; Zheng Jin

(57) ABSTRACT

Methods for a mobile station to handover between IEEE 802.16e and 802.16m systems are provided. The mobile station is served by an IEEE 802.16e-only base station or an IEEE 802.16e zone of a 16e/16m-conexistence base station. In a zone-switch based handover procedure, the mobile station first performs an IEEE 802.16e legacy handover procedure such that the mobile station handovers from the serving base station to an IEEE 802.16e zone of a target base station. The mobile station then performs a zone-switch procedure such that the mobile station switches from the IEEE 802.16e zone to an IEEE 802.16m zone of the target base station. In a direct handover procedure, the mobile station performs an IEEE 802.16m handover procedure such that the mobile station handovers from the serving base station to the IEEE 802.16m zone of the target base station directly.

24 Claims, 10 Drawing Sheets

(56) References Cited

OTHER PUBLICATIONS

Haihong Zheng et al., Intra-RAT Mobility Support in 802.16m, IEEE C802.16m-08/646r1, Jul. 11, 2008 (12 pages).

Zexian Li et al., Mobility-Network Entry in 802.16m, IEEE C802.16m-08/760r2, Jul. 7, 2008 (8 pages).

Kelvin Chou et al., Mobility Management with Multi-Carrier Support in IEEE 802.16m, IEEEC802.16x-08/144r3, Mar. 20, 2008 (7 pages).

International Search Report and Written Opinion of International Search Authority for PCT/CN2009/074573 dated Feb. 4, 2009 (10 pages).

IEEE 802.16 Broadband Wireless Access Working Group. The draft IEEE 802.16m system description document. IEEE 802.16m-08/003r5. Oct. 3, 2008 pp. 31 to 32 and p. 34 of the text.

IEEE 802.16 Broadband Wireless Access Working Group. The draft IEEE 802.16m system description document. IEEE 802.16m-08/003r7. Feb. 7, 2009 Section 10.3 of the text.

Haihong Zheng et al., "Intra-RAT Mobility Support in 802.16m," IEEE C802.16m-08/646r1, Jul. 11, 2008.

EPO Office Action for EP application 11156652 dated Aug. 6, 2013 (8 pages).

EPO Office Action for EP application 09821598 dated Aug. 8, 2013 (7 pages).

* cited by examiner

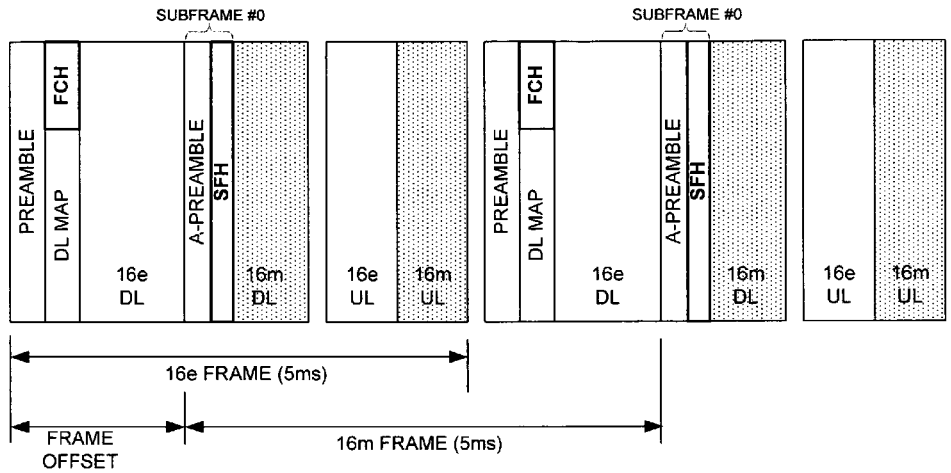

FIG. 3

| SYNTAX | SIZE (BIT) | NOTES |
|---|---|---|
| DL_FRAME_PREFIX_FORMAT () { | - | - |
| USED SUBCHANNEL BITMAP | 6 | BIT 0: SUBCHANNEL GROUP 0<br>BIT 1: SUBCHANNEL GROUP 1<br>BIT 2: SUBCHANNEL GROUP 2<br>BIT 3: SUBCHANNEL GROUP 3<br>BIT 4: SUBCHANNEL GROUP 4<br>BIT 5: SUBCHANNEL GROUP 5 |
| RESERVED | 1 | SHALL BE SET TO ZERO |
| REPETITION_CODING_INDICATION | 2 | 0B00: NO REPETITION CODING ON DL-MAP<br>0B11: REPETITION CODING OF 2 USED ON DL-MAP<br>0B10: REPETITION CODING OF 4 USED ON DL-MAP<br>0B11: REPETITION CODING OF 6 USED ON DL-MAP |
| CODING_INDICATION | 3 | 0B000: CC ENCODING USED ON DL-MAP<br>0B001: BTC ENCODING USED ON DL-MAP<br>0B010: CTC ENCODING USED ON DL-MAP<br>0B011: ZT CC ENCODING USED ON DL-MAP<br>0B100: CC ENCODING W/ OPTIONAL INTERLEAVER<br>0B101: LDPC ENCODING USED ON DL-MAP<br>0B110 TO 0B111: RESERVED |
| DL_MAP_LENGTH | 8 | - |
| RESERVED | 4 | SHALL BE SET TO ZERO |
| } | - | - |

OFDMA DL FRAME PREFIX FORMAT

FIG. 4

ZONE-SWITCH BASED HANDOVER PROCEDURE

DIRECT HANDOVER PROCEDURE

METHOD AND APPARATUS FOR HANDOVER BETWEEN IEEE 802.16E AND 802.16M SYSTEMS

CROSS REFERENCE TO RELATED APPLICATIONS

This application claims priority under 35 U.S.C. §119 from U.S. Provisional Application No. 61/107,407, entitled "Intra-RAT Handover from 16e BS to 16e/16m BS," filed on Oct. 22, 2008, the subject matter of which is incorporated herein by reference.

TECHNICAL FIELD

The disclosed embodiments relate generally to wireless network communications, and, more particularly, to handover procedure between IEEE 802.16e and IEEE 802.16m systems.

BACKGROUND

IEEE 802.16 is a series of Broadband Wireless Access Standards authorized by the IEEE. The IEEE 802.16 family of standards is officially called WirelessMAN, developed for the global deployment of broadband Wireless Metropolitan Area Networks, which is also called WiMAX. IEEE 802.16e is one of the most popular implementation of the IEEE 802.16 standards. The IEEE 802.16e standard addresses "Mobile Broadband Wireless Access System", also called Mobile WirelessMAN originally defined by the IEEE 802.16e-2005 amendment. The IEEE 802.16e standard essentially standardizes two aspects of the air interface, the physical (PHY) layer and the Media Access Control (MAC) layer. At the PHY layer, IEEE 802.16e uses scalable OFDMA to carrier data, supporting channel bandwidths of between 1.25 MHz and 20 MHz. At the MAC layer, IEEE 802.16e describes a number of connection management functions, mobility management functions and convergence sublayers that defines how data is encapsulated and classified over the air interface.

The IEEE 802.16m standard addresses "Air Interface for Fixed and Mobile Broadband Wireless Access System". The IEEE 802.16m standard amends the legacy IEEE 802.16e WirelessMAN-OFDMA specification to provide an advanced air interface for operation in licensed bands. It meets the system requirements of IMT-Advanced next generation mobile networks, while provides continuing support for legacy IEEE 802.16e WirelessMAN-OFDMA equipments. The purpose of the IEEE 802.16m standard is to provide performance improvements necessary to support future advanced services and applications, such as the support of 1 Gbps peak transmission rate required by the International Telecommunications Union (ITU-R).

In general, network deployment takes an evolution path, rather than a revolution one. Therefore, it is foreseeable that WiMAX systems will be gradually evolved from legacy IEEE 802.16e systems to IEEE 802.16e and IEEE 802.16m coexisting systems and eventually to 16m-only systems when the IEEE 802.16m standard starts to emerge. During the early stage of the network evolution, 16e-only base stations (BS) have more service coverage than new 16e/16m and 16m-only BSs. While the IEEE 802.16m standard supports legacy IEEE 802.16e-only equipments (i.e., backward compatibility), the IEEE 802.16e standard does not support the capability of future IEEE 802.16m equipments. Therefore, new challenges and problems arise in supporting service continuity between an IEEE 802.16e and IEEE 802.16m coexisting wireless network, which includes features such as scanning and handover.

When a mobile station (MS) handovers from its serving base station (SBS) to a target base station (TBS), the mobile station normally receives neighbor advertisement information (NBR-ADV) broadcasted from the serving base station, scans the neighboring base stations, and selects the target base station from the scanned neighboring cells by either MS or SBS. Unfortunately, a legacy IEEE 802.16e-only base station cannot broadcast any IEEE 802.16m message to inform the mobile station the existence of an IEEE 802.16m-only neighboring cell. Therefore, if the neighboring cells are IEEE 802.16m-only, then the mobile station may be forced to use blind scanning, a more time-consuming and less efficient way, to scan and select its desired IEEE 802.16m target base station. If, however, the neighboring cells have IEEE 802.16e/16m-coexistence capability, then it may become possible for the serving base station to inform the mobile station of the 802.16e/16m-coexistence capability of the neighboring cells.

One possible scheme is to include IEEE 802.16m zone information in IEEE 802.16e neighbor advertisement information, which requires modification of the IEEE 802.16e specification (e.g., MOB_NBR-ADV). Another possible scheme (see C802.16m-08/864r4 and C802.16m-08/646r1 for more detail) is to define a new Downlink Channel Description (DCD) Type Length Value (TLV) message for IEEE 802.16e/16m-coexistence indication, which also requires modification of the IEEE 802.16e specification. In addition, it takes longer delay for the mobile station to discover the coexistence because the DCD TLV message is not broadcasted every frame. Other proposals include carrying IEEE 802.16m zone information using a special IEEE 802.16e message, defining new MAC versions for IEEE 802.16e/16m mixed-mode base station, etc. Each of the proposed methods has its own limitations and thus not desirable.

SUMMARY

Methods for a mobile station to handover between IEEE 802.16e and 802.16m systems are provided. In a wireless network that supports both IEEE 802.16e zone and IEEE 802.16m zone, a mobile station is served by an IEEE 802.16e-only base station or an IEEE 802.16e zone of a 16e/16m-conexistence base station. Because IEEE 802.16m zone provides superior service quality and advanced features, it is desirable for the mobile station to be able to discover neighboring cells with IEEE 802.16e and IEEE 802.16m coexistence capability and to be able to handover from the serving base station to an IEEE 802.16m zone of a target base station.

To discover neighboring cells with IEEE 802.16e and IEEE 802.16m coexistence capability, the mobile station obtains neighboring cell information broadcasted from the serving base station and scans neighboring cells based on the obtained neighboring cell information. In one novel aspect, a neighboring cell indicates its IEEE 802.16e/16m-coexistence capability using a reserved bit in a Frame Control Header (FCH) and broadcasts the FCH via IEEE 802.16e/16m-coexistence frame structure. During scanning, the mobile station checks the FCH information broadcasted by the neighboring cells and discovers neighboring cells with IEEE 802.16e/16m-coexistence capability. In one embodiment, the mobile station selects one of the neighboring cells as the target base station and obtains IEEE 802.16m SuperFrame Header (SFH) information of the target base station for 16e-16m handover. In another embodiment, the mobile station reports the scanning result back to the serving base station, and one of the reported neighboring cells is selected as the target base station for 16e-16m handover. There are two different procedures to perform handover from the serving base station to the IEEE 802.16m zone of the target base station: a zone-switch based 16e-16m handover procedure and a direct 16e-16m handover procedure.

In a zone-switch based handover procedure, the mobile station first performs an IEEE 802.16e legacy handover procedure such that the mobile station handovers from the serving base station to an IEEE 802.16e zone of a target base station. The mobile station then performs a zone-switch procedure such that the mobile station switches from the IEEE 802.16e zone to an IEEE 802.16m zone of the target base station. The legacy handover may be initiated by the mobile station or the serving base station. Similarly, the zone-switch procedure may be initiated by the mobile station or the target base station, and the zone-switch procedure may be triggered during the legacy handover procedure or after the legacy handover procedure is completed. To optimize the zone-switch procedure, the 802.16m module of the target base station retrieves related information of the mobile station from the 802.16e module of the target base station to shorten the handover interruption time.

In a direct handover procedure, the mobile station performs an IEEE 802.16m handover procedure such that the mobile station handovers from the serving base station to the IEEE 802.16m zone of the target base station directly. In one novel aspect, in order to distinguish the direct handover from other types of handover procedure, the mobile station identifies itself with IEEE 802.16e identity information, such as a handover ID or a MAC address, for context switching. In one embodiment, the mobile station is a multi-carrier mobile station having a primary RF carrier and a secondary RF carrier. The mobile station uses the secondary carrier to perform direct handover procedure with the target base station, while maintaining data communication with the serving base station using the primary carrier.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 3 is a diagram that illustrates an IEEE 802.16e/16m coexistence frame structure.

FIG. 4 is an OFDMA Downlink Frame Prefix format defined in the IEEE 802.16e standard.

DETAILED DESCRIPTION

Reference will now be made in detail to some embodiments of the invention, examples of which are illustrated in the accompanying drawings.

Figure 1:
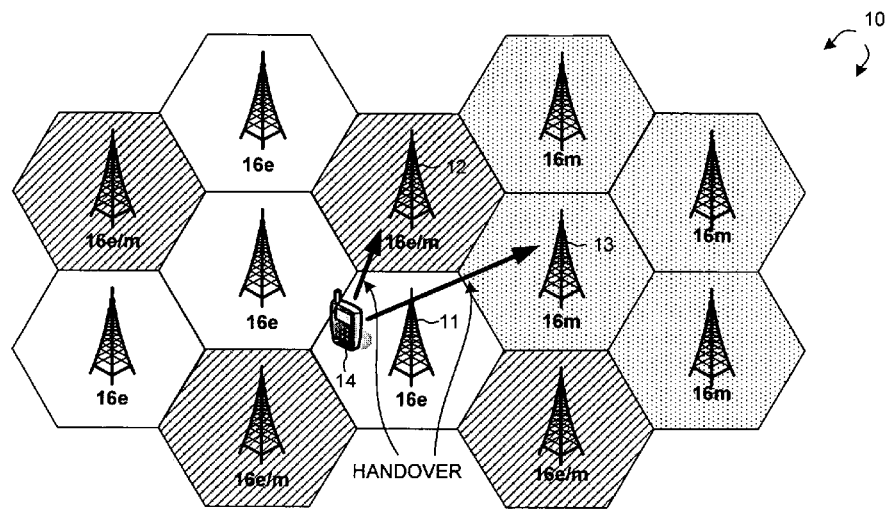
FIG. 1 illustrates a cellular OFDM/OFDMA system 10 in accordance with one novel aspect.

FIG. 1 illustrates a cellular Orthogonal Frequency Division Multiplexing (OFDM) and/or Orthogonal Frequency Division Multiple Access (OFDMA) system 10 in accordance with one novel aspect. Cellular OFDM/OFDMA system 10 is a wireless network that supports both IEEE 802.16e zone and IEEE 802.16m zone as defined under the IEEE 802.16 series of standards. Wireless network 10 comprises a mobile station 14 (MS14) and a plurality of base stations of different types. As illustrated in FIG. 1, a first type of base station (i.e., BS11) is an IEEE 802.16e-only base stations that supports only IEEE 802.16e zone. A second type of base station (i.e., BS12) is an IEEE 802.16e/16m-coexistence base station that supports both IEEE 802.16e zone and IEEE 802.16m zone. A third type of base station (i.e., BS13) is an IEEE 802.16m-only base station that supports only IEEE 802.16m zone. MS14 is an IEEE 802.16m mobile station that is able to operate with a 16e-only BS, a 16m-only BS, and a 16e/16m-coexistence BS. In the example of FIG. 1, 16e-only BS11 is a serving base station that serves MS14, and 16e/16m-coexistence BS12 or 16m-only BS13 may later be selected as a target base station for MS14 to handover.

Figure 2:
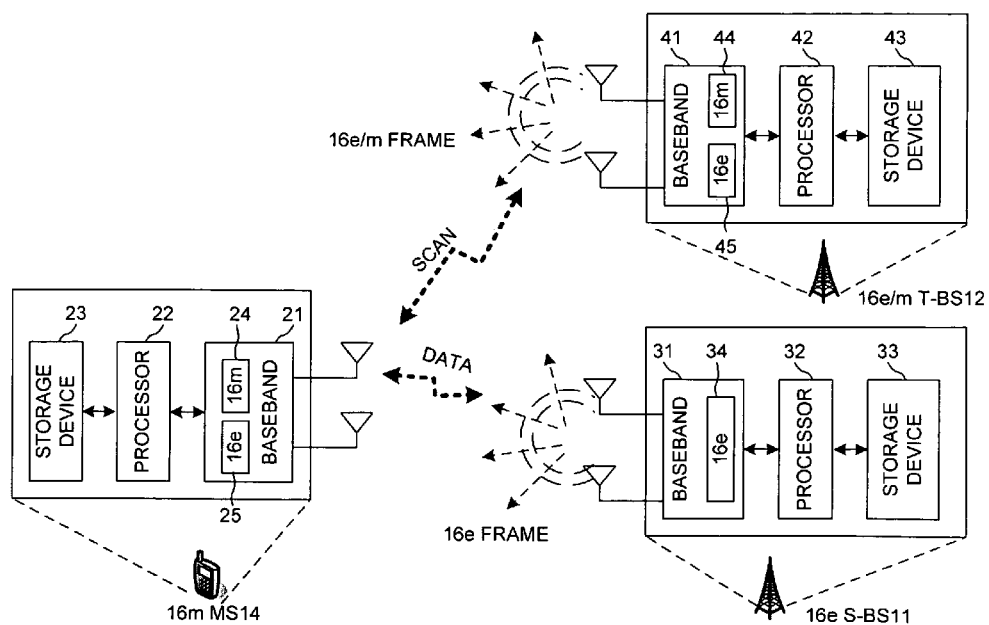
FIG. 2 illustrates a simplified block diagram of two base stations and one mobile station in accordance with one novel aspect.

FIG. 2 illustrates a simplified block diagram of 16m mobile station MS14, 16e-only serving base station S-BS11 and 16e/16m-coexistence target base station T-BS12 in wireless network 10. MS14 comprises a baseband module 21, a processor 22, a storage device 23 and a single or multiple radio frequency (RF) modules including antennas. Baseband module 21 further comprises an IEEE 802.16m module 24 and an IEEE 802.16e module 25. Serving base station S-BS11 comprises a baseband module 31, a processor 32, a storage device 33, and a single or multiple RF modules including antennas. Baseband module 31 further comprises an IEEE 802.16e module 34. Target base station T-BS12 comprises a baseband module 41, a processor 42, a storage device 43, and a single or multiple RF modules including antennas. Baseband module 41 further comprises an IEEE 802.16m module 44 and an IEEE 802.16e module 45. Each RF module receives and/or transmits data stream via a single RF carrier, while each processor fetches IEEE 802.16e and/or IEEE 802.16m specification-compliant protocol commands from a corresponding storage device and instructs a corresponding baseband module to handle signal processing of the data stream accordingly.

In the example of FIG. 2, mobile station MS14 communicates with its serving base station BS11 in IEEE 802.16e zone via IEEE 802.16e uplink and downlink frame structures. In the meantime, serving base station BS11 broadcasts neighbor advertising information via MOB_NBR-ADV messages. Upon receiving the broadcasted neighbor advertising information, mobile station MS14 starts to scan the advertised neighboring cells including base station BS12. In one novel aspect, BS12 indicates its IEEE 802.16e/16m-coexistence capability using a reserved bit in a Frame Control Header (FCH) and broadcasts the FCH via IEEE 802.16e/16m-coexistence frame structure. During scanning, MS14 discovers the 802.16e/16m-coexistence capability of BS12 by checking the reserved bits in the FCH broadcasted by BS12. By discovering the 16e/16m-coexistence capability through scanning, mobile station MS14 is able to select BS12 as its preferred target base station for handover.

FIG. 3 is a diagram that illustrates an IEEE 802.16e/16m-coexistence frame structure. As illustrated in FIG. 3, an IEEE 802.16e/16m-coexistence frame comprises alternating IEEE 802.16e frames and IEEE 802.16m frames, offset by a frame offset. Each IEEE 802.16e frame and IEEE 802.16m frame has a 5 ms frame length, and comprises 802.16e downlink (DL) bursts and uplink (UL) bursts, and 802.16m DL subframes and UL subframes. Each 802.16e frame starts with a preamble followed by an IEEE 802.16e Frame Control Header (FCH). Each 802.16m frame starts with an IEEE 802.16m DL subframe #0, which includes an A-PREAMBLE and a Super Frame Header (SFH) for IEEE 802.16m zone.

FIG. 4 is an OFDMA Downlink Frame Prefix format defined in IEEE 802.16e standard. As illustrated in FIG. 4, there are two reserved fields within the defined DL_FRAME_PREFIX_FORMAT (also referred to as FCH) of each IEEE 802.16e frame. As required by the IEEE 802.16e standard, both reserved fields shall be set to zero. In one novel aspect, a reserved bit in either of the two reserved fields is used to indicate the IEEE 802.16e/16m-coexistence capability. For example, BS11 is an IEEE 802.16e-only base station, and all the reserved bits in its FCH are set to zero. On the other hand, BS12 is an IEEE 802.16e/16m-coexistence base station, and one of the reserved bits in its FCH is set to one or a non-zero value to indicate such coexistence capability. As a result, because each FCH appears periodically in every IEEE 802.16e frame (i.e., every 5 ms), MS14 is able to discover the coexistence capability of BS12 during fast and reliable scanning without relying on any new messaging scheme.

Once a mobile station served in an IEEE 802.16e zone discovers the IEEE 802.16e/16m-coexistence capability of a target base station, it may handover from the IEEE 802.16e zone of its serving base station to an IEEE 802.16m zone of the target base station. There are two different procedures to perform such 16e-16m handover from IEEE 802.16e zone to IEEE 802.16m zone. In a first method, a zone-switch based handover procedure is performed, where the mobile station first handovers from the IEEE 802.16e zone of the serving base station to an IEEE 802.16e zone of the target base station via IEEE 802.16e handover procedure, and then switches to the IEEE 802.16m zone of the target base station via IEEE 802.16m network reentry procedure. In a second method, a direct 16e-16m handover procedure is performed, where the mobile station handovers from the IEEE 802.16e zone of the serving base station to the IEEE 802.16m zone of the target base station directly via IEEE 802.16m handover procedure.

Figure 5:
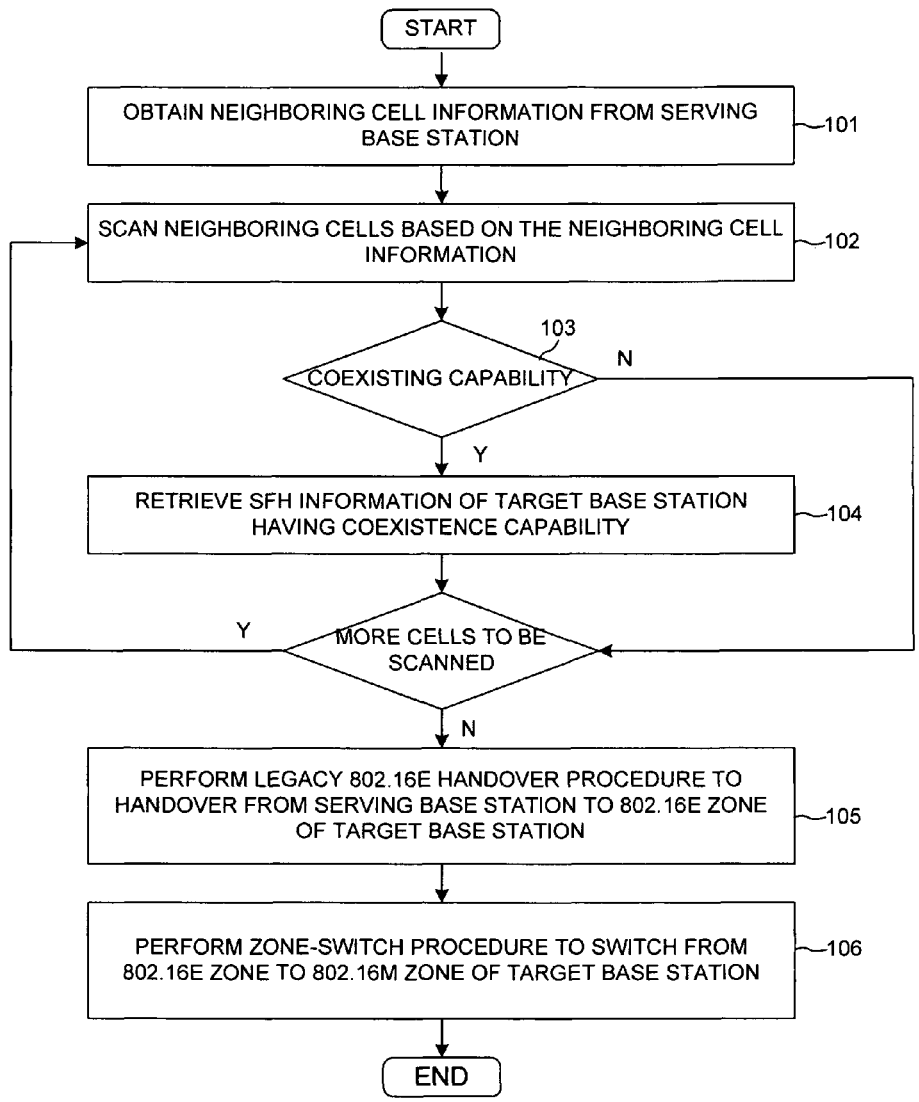
FIG. 5 is a flow chart that illustrates a method of zone-switch based handover procedure in accordance with one novel aspect.

FIG. 5 is a flow chart that illustrates a method of zone-switch based handover procedure in accordance with one novel aspect. A mobile station first obtains neighboring cell information from its IEEE 802.16e-only or IEEE 803.16e/16m-coexistence serving base station (step 101). For example, the serving base station broadcasts neighbor advertisement information via MOB_NBR-ADV messages. The mobile station then scans the neighboring cells based on the obtained neighboring cell information (step 102). During scanning, the mobile station checks IEEE 802.16e FCH information broadcasted by the neighboring cells and discovers whether a neighboring cell (a target base station candidate) has IEEE 802.16e/16m coexistence capability (step 103). If the target base station candidate has the coexistence capability, then the mobile station retrieves IEEE 802.16m SFH information of the target base station candidate (step 104). For example, the mobile station may retrieve the SFH information from an IEEE 802.16e/16m-coexistence frame by applying a frame offset. After scanning is completed, the mobile station performs legacy IEEE 802.16e handover procedure to handover from the serving base station to an IEEE 802.16e zone of the target base station, which is determined or triggered by either serving base station or mobile station (step 105). Finally, the mobile station performs zone-switch procedure to switch from the IEEE 802.16e zone to an IEEE 802.16m zone of the target base station (step 106). In some embodiments, operations of step 104 may not be performed by the mobile station once discovering the coexistence capability. Instead, operations of step 104 may be integrated into the zone-switch procedure as described in step 106.

Figure 6:
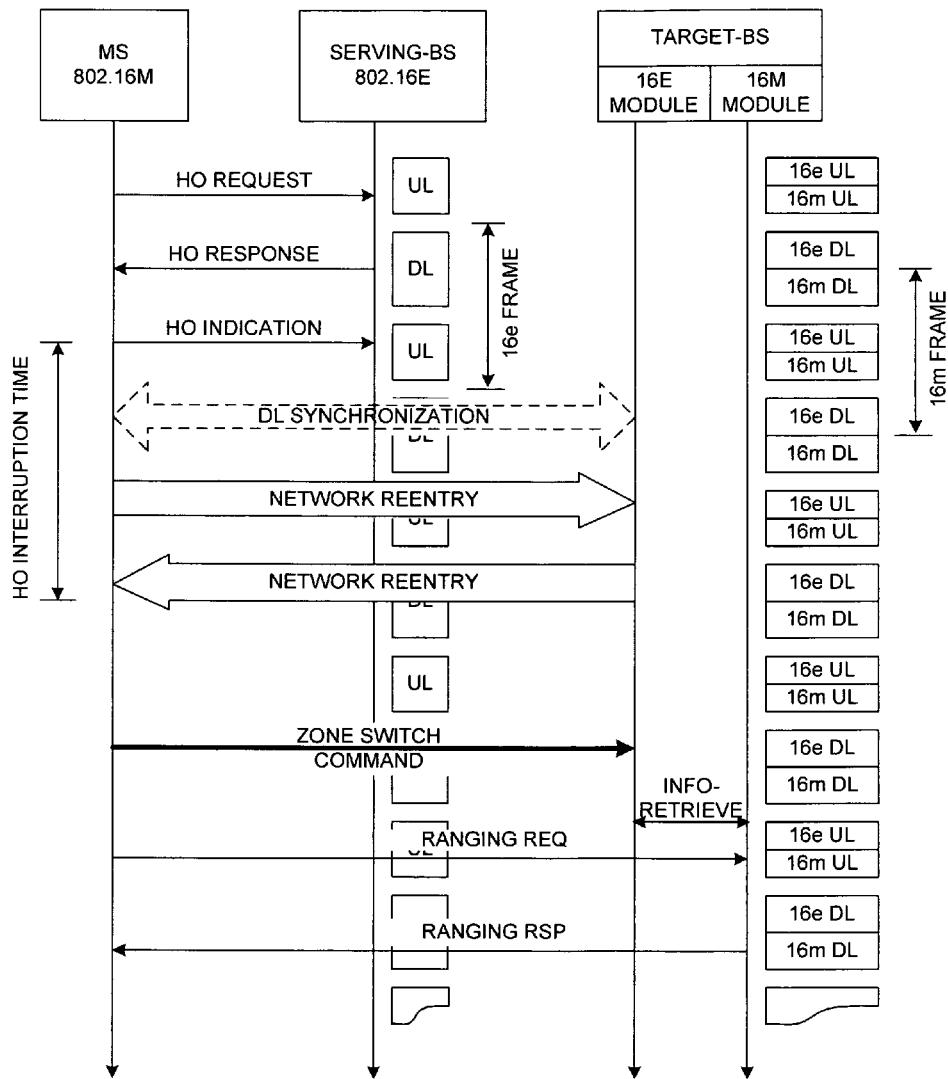
FIG. 6 illustrates a message sequence chart of one embodiment of a zone-switch based handover procedure.

FIG. 6 illustrates a message sequence chart of an embodiment of a zone-switch based handover procedure. In the example of FIG. 6, a mobile station performs a zone-switch based handover procedure to handover from an IEEE 802.16e-only serving BS to an IEEE 802.16e/16m-coexistence target BS. As illustrated in FIG. 6, the mobile station first initiates a legacy IEEE 802.16e handover procedure with the serving BS. The mobile station sends a handover (HO) request message to the serving BS and receives a handover (HO) response back from the serving BS. After receiving the handover response, the mobile station sends a handover indication message and disconnects service from the serving BS. The mobile station then performs optional DL and UL synchronization with an IEEE 802.16e module of the target BS. Finally, the mobile station performs network reentry with the IEEE 802.16e module of the target BS to establish a new data path with the target BS. By using legacy handover procedure between two IEEE 802.16e base stations, service continuity is guaranteed. In addition, handover interruption time may be shortened by using IEEE 802.16e optimized and/or seamless handover procedure.

After the legacy IEEE 802.16e handover procedure is completed, the mobile station initiates a zone-switch procedure by sending a zone-switch command (i.e. a standalone MAC message or a zone-switch indication embedded in a MAC management message such as RNG-REQ) to the target BS. The mobile station then performs network reentry with an IEEE 802.16m module of the target BS. The mobile station sends a ranging request and receives a ranging response to/from the IEEE 802.16m module of the target BS to complete the zone-switch procedure. To optimize the zone-switch procedure, the mobile station may identify itself using an IEEE 802.16e CID to the target BS. With the CID information, the 802.16m module of the target BS may retrieve relative information of the mobile station from the 802.16e module of the target BS, avoiding excessive message exchange between the mobile station and the target BS.

In the example of FIG. 6, the mobile station initiates the legacy IEEE 802.16e handover procedure. Alternatively, the serving BS may also initiate the legacy handover procedure. For example, the mobile station may report scanning result to the serving BS such that the serving BS may select one of the reported neighboring cells as the target base station and initiate the handover procedure by sending a handover command to the mobile station. Because IEEE 802.16m zone provides superior service as compared to IEEE 802.16e zone, it is desirable for the serving BS to be able to select a neighboring cell that has coexistence capability as the target base station. However, the serving BS is not able to distinguish an IEEE 802.16e-only neighboring cell from an IEEE 802.16e/16m-coexistence neighboring cell. In one novel aspect, if the scanning result contains only neighboring cells that support coexistence capability, then the mobile station is able to facilitate the serving BS to select one of neighboring cells has coexistence capability as the target base station.

Similar to the legacy IEEE 802.16e handover procedure, the zone-switch procedure may be initialized either by the mobile station or by the target base station. In addition, the zone-switch procedure may be triggered either after the legacy handover procedure or during the legacy handover procedure. The different variations of zone-switch based handover procedures are now described below with more details.

Figure 7:
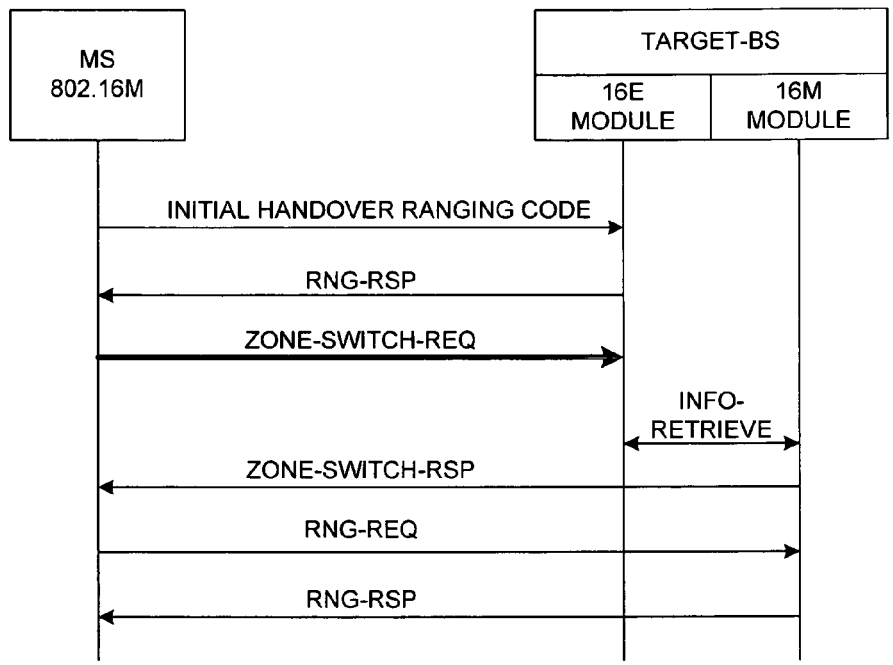
FIG. 7 illustrates a message sequence chart of a first embodiment of a mobile station initiated zone-switch based handover.

FIG. 7 illustrates a message sequence chart of a first embodiment of a mobile station initiated zone-switch based handover procedure. In the example of FIG. 7, the mobile station first sends an initial handover ranging code to the 802.16e module of the target BS, and receives ranging response back from the 802.16e module of the target BS. The mobile station then initiates the zone-switch procedure by sending a zone-switch request message to the target BS. After receives the zone-switch request message, the 802.16m module of the target BS retrieves related information of the mobile station from the 802.16e module of the target BS, and sends a zone-switch response message back to the mobile station. Finally, the mobile station performs network reentry with the 802.16m module of the target BS to complete the zone-switch based handover procedure. In some embodiments, the zone-switch command may be encoded as a parameter of an RNG-REQ MAC management message, rather than sending a standalone MAC management message for zone-switch.

Figure 8:
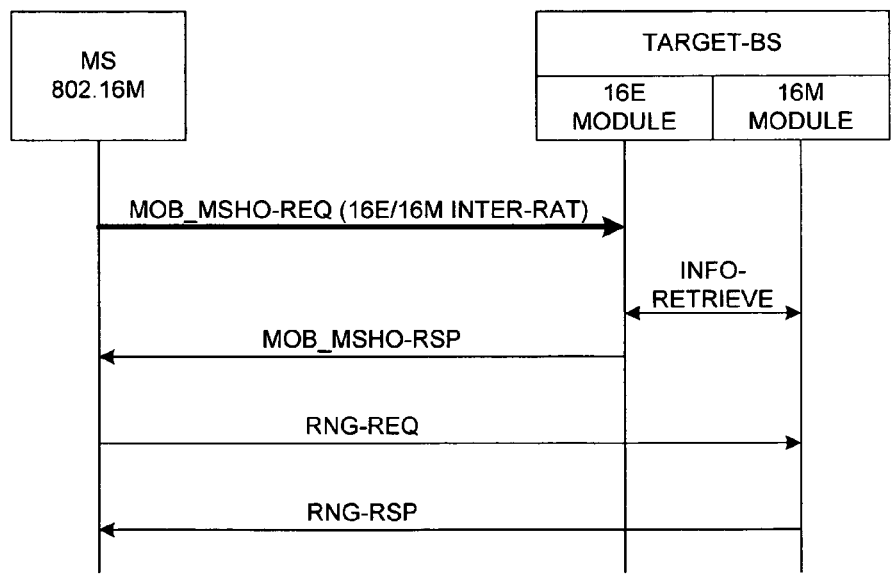
FIG. 8 illustrates a message sequence chart of a second embodiment of a mobile station initiated zone-switch based handover.

FIG. 8 illustrates a message sequence chart of a second embodiment of a mobile station initiated zone-switch based handover procedure. In the example of FIG. 8, the mobile station initiates the zone-switch procedure by sending an IEEE 802.16e/16m inter-RAT message (i.e., modify current reserved bits in MOB_MSHO-REQ) to the 802.16e module of the target BS. After receives the MOB_MSHO-REQ message, the 802.16m module of the target BS then retrieves relative information of the mobile station from the 802.16e module of the target BS, and sends a MOB_MSHO-RSP message back to the mobile station. Finally, the mobile station performs network reentry with the 802.16m module of the target BS to complete the zone-switch based handover procedure.

Figure 9:
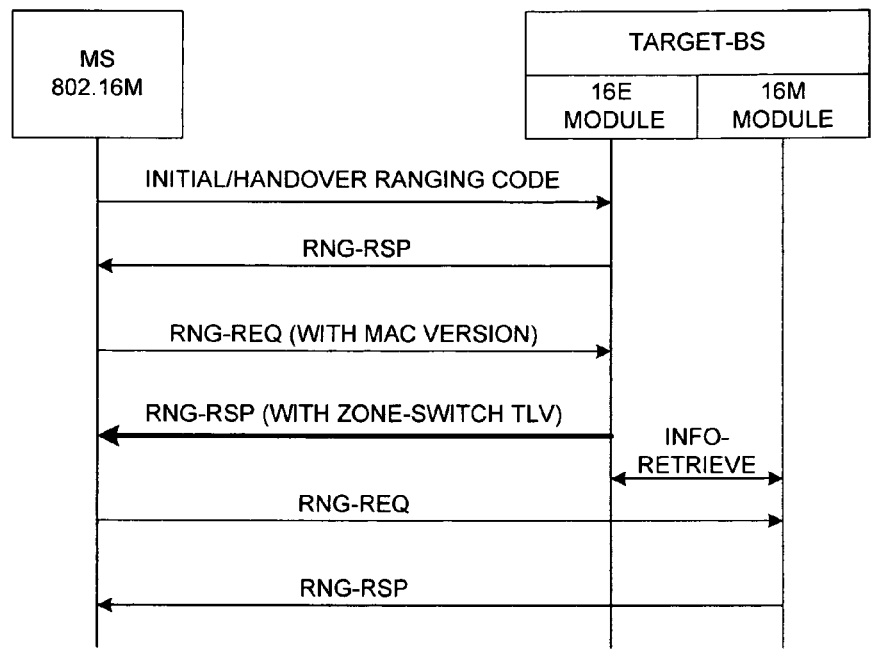
FIG. 9 illustrates a message sequence chart of a third embodiment of a base station initiated zone-switch based handover.

FIG. 9 illustrates a message sequence chart of a third embodiment of a base station initiated zone-switch based handover procedure. In the example of FIG. 9, during the legacy IEEE 802.16e handover procedure, the mobile station sends an initial handover ranging code to the 802.16e module of the target BS and receives a ranging response back from the 802.16e module of the target BS. The mobile station then sends another ranging request, which includes a MAC version that indicates IEEE 802.16m capability of the mobile station. After learning the 802.16m capability of the mobile station, the target BS initiates the zone-switch procedure by sending a ranging response that includes a zone-switch command (i.e., TLV). The 16m module of the target BS also retrieves relative information of the mobile station from the 802.16e module of the target BS. Finally, the mobile station performs network reentry with the 16m module of the target BS to complete the zone-switch based handover procedure.

Figure 10:
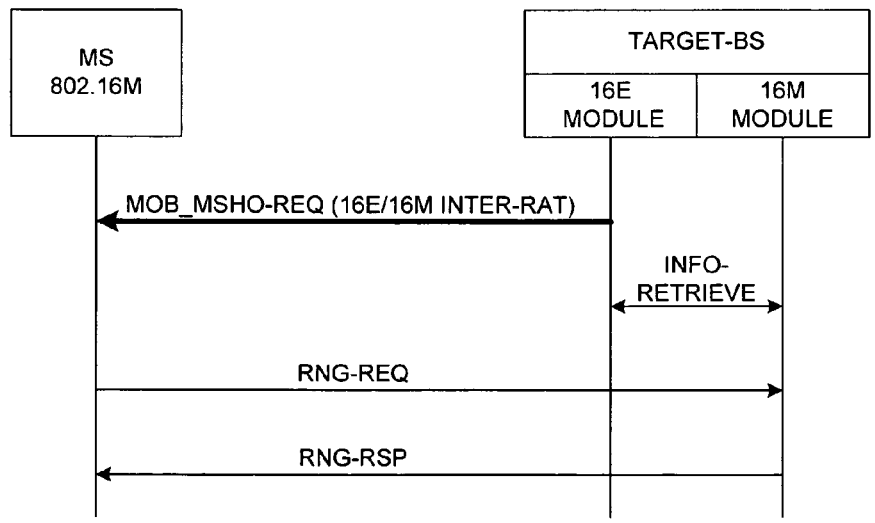
FIG. 10 illustrates a message sequence chart of a fourth embodiment of a base station initiated zone-switch based handover.

FIG. 10 illustrates a message sequence chart of a fourth embodiment of a base station initiated zone-switch based handover procedure. In the example of FIG. 10, the target BS first sends an IEEE 802.16e/16m inter-RAT message (i.e., modify current reserved bits in MOB_MSHO-RSP) to the mobile station to initiate the zone-switch procedure. The 802.16m module of the target BS then retrieves relative information of the mobile station from the 802.16e module of the target BS. The mobile station then performs network reentry with the 16m module of the target base station to complete the zone-switch procedure.

Figure 11:
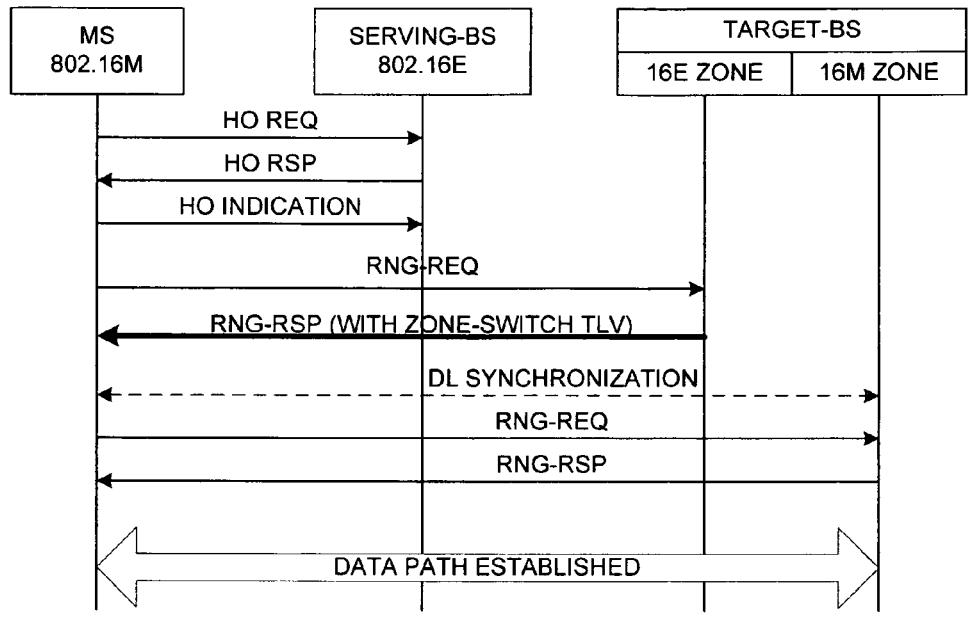
FIG. 11 illustrates a message sequence chart of a fifth embodiment of a zone-switch based handover that is triggered during legacy 802.16e handover.

FIG. 11 illustrates a message sequence chart of a fifth embodiment of a zone-switch based handover that is triggered during legacy 802.16e handover. In the example of FIG. 11, a mobile station sends a handover indication and disconnects service from an IEEE 802.16e serving BS after receiving a handover response from the serving BS. The mobile station then sends a ranging request to an IEEE 802.16e zone of a target BS to perform legacy IEEE 802.16e handover procedure. During the legacy handover procedure, the 802.16e zone of the target BS sends a ranging response back to the mobile station. The ranging response includes a zone-switch TLV parameter. After receiving the zone-switch TLV parameter, the mobile station performs synchronization and network reentry with the 802.16m module of the target BS to complete the zone-switch procedure. A new data path is established after the completion of zone-switch procedure.

Figure 12:
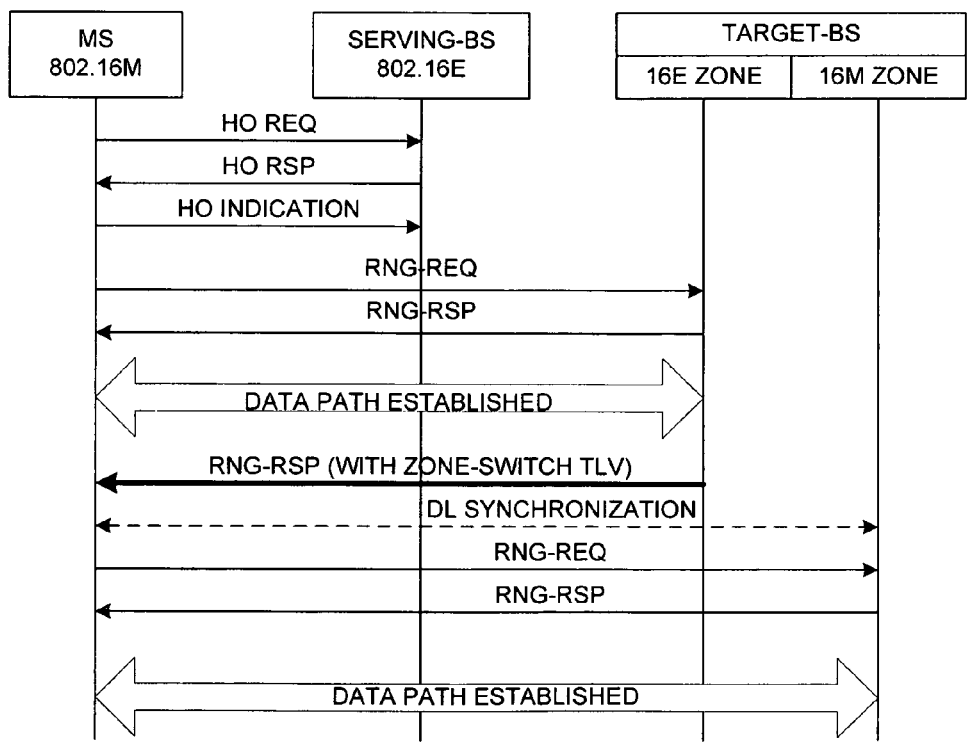
FIG. 12 illustrates a message sequence chart of a sixth embodiment of a zone-switch based handover that is triggered after legacy 802.16e handover.

FIG. 12 illustrates a message sequence chart of a sixth embodiment of a zone-switch based handover that is triggered after legacy 802.16e handover. In the example of FIG. 12, a mobile station sends a handover indication and disconnects service from an IEEE 802.16e serving BS after receiving a handover response from the serving BS. The mobile station then sends a ranging request to an IEEE 802.16e zone of the target BS to perform legacy IEEE 802.16e handover procedure. The 802.16e module of the target BS sends a ranging response back to the mobile station to continue handover procedure. After the legacy handover is completed and a new data path in the IEEE 802.16e zone is established, the target BS triggers the zone-switch procedure by sending another ranging response with a zone-switch TLV message. After receiving the zone-switch TLV parameter, the mobile station performs synchronization and network reentry with the 802.16m module of the target BS to complete the zone-switch procedure. A new data path in the IEEE 802.16m zone is established after the completion of zone-switch procedure. As compared to FIG. 11, the handover interruption time in FIG. 12 is shorter than the handover interruption time in FIG. 11 because the new data path in the IEEE 802.16e zone is established quickly using the legacy IEEE 802.16e handover procedure.

Figure 13:
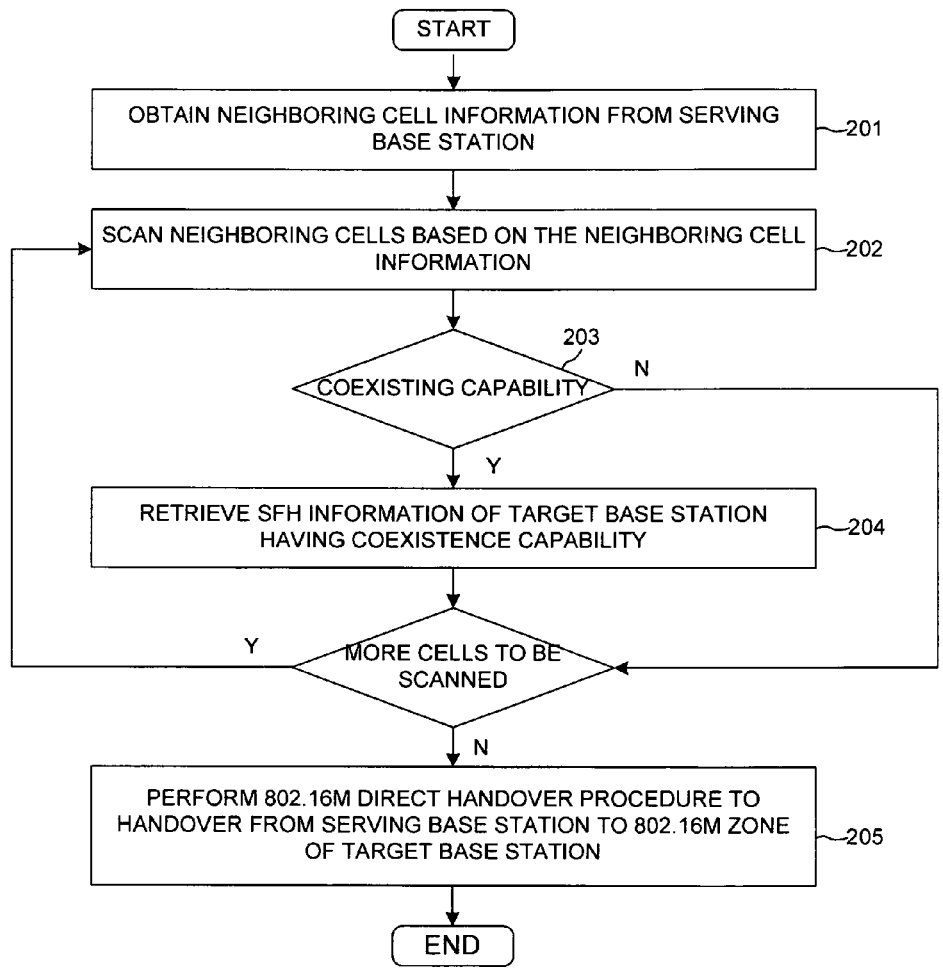
FIG. 13 is a flow chart that illustrates a method of direct handover procedure in accordance with one novel aspect.

FIG. 13 is a flow chart that illustrates a method of direct handover procedure in accordance with one novel aspect. A mobile station first obtains neighboring cell information from its IEEE 802.e-only serving base station (step 201). For example, the serving base station broadcasts neighbor advertisement information via MOB_NBR-ADV messages. The mobile station then scans the neighboring cells based on the obtained neighboring cell information (step 202). During scanning, the mobile station checks IEEE 802.16e FCH information broadcasted by the neighboring cells and discovers whether a neighboring cell (a target base station candidate) has IEEE 802.16e/16m coexistence capability (step 203). If the target base station candidate has the coexistence capability, then the mobile station retrieves IEEE 802.16m SFH information of the target base station candidate (step 204). For example, the mobile station may retrieve the SFH information from an IEEE 802.16e/16m-coexistence frame by applying a frame offset. After scanning is completed, the mobile station performs IEEE 802.16m handover procedure to handover from the serving base station to an IEEE 802.16m zone of the target base station directly which is determined by either mobile station or serving base station (step 205).

Figure 14:
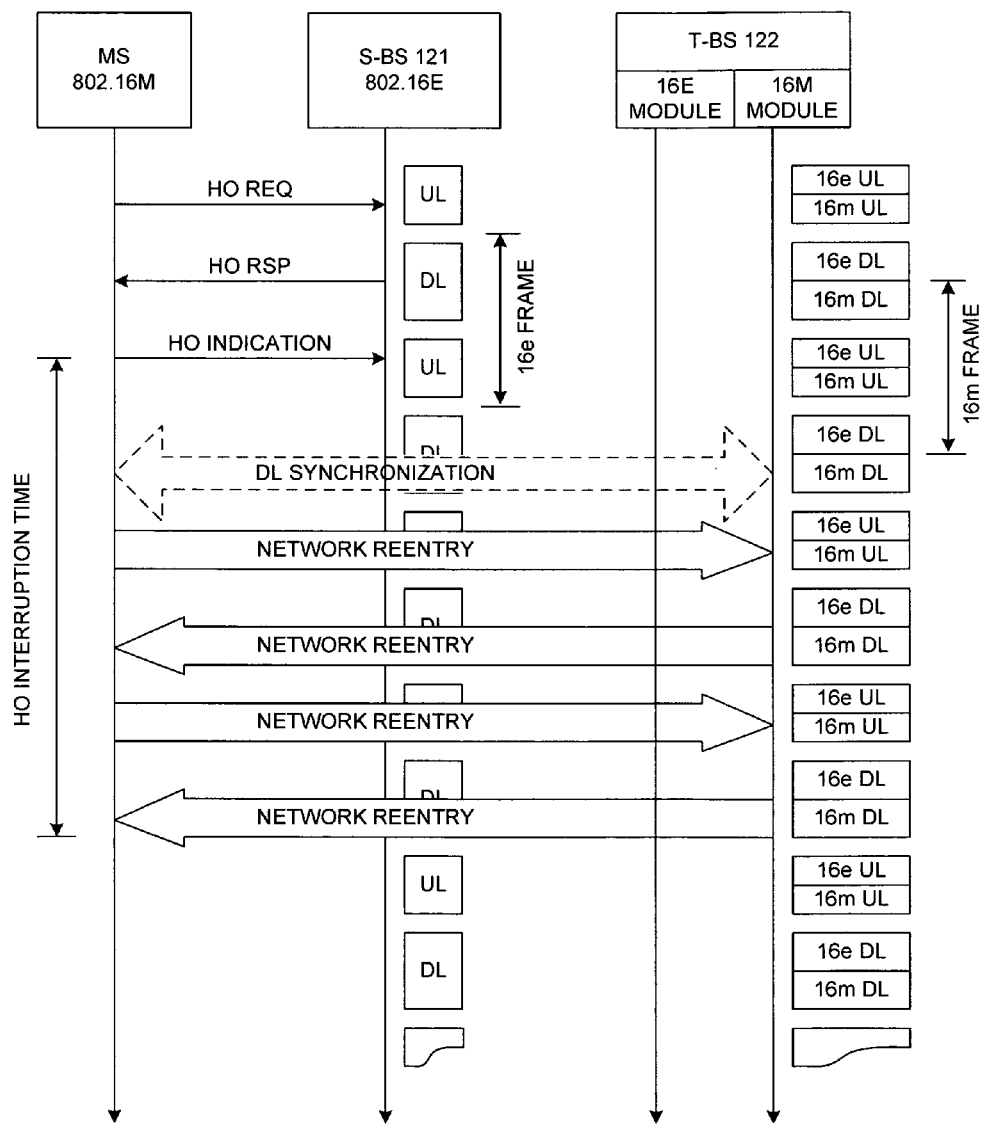
FIG. 14 illustrates a message sequence chart of one embodiment of a direct handover procedure.

FIG. 14 illustrates a message sequence chart of one embodiment of a direct handover procedure. In the example of FIG. 14, a mobile station performs an IEEE 802.16m handover procedure to handover from an IEEE 802.16e-only serving BS to an IEEE 802.16e/16m-coexistence target BS. As illustrated in FIG. 14, the mobile station sends a handover request message to the serving BS and receives a handover response back from the serving BS. After receiving the handover response, the mobile station sends a handover indication message and disconnects service from the serving BS. The mobile station then performs optional DL and UL synchronization with an IEEE 802.16m module of the target BS. Finally, the mobile station performs network reentry with the IEEE 802.16m module of the target BS to establish a new data path with the target BS. As compared to zone-switch based handover, direct handover is simpler and has less messaging. However, because the serving BS may not recognize the 802.16m module of the target BS, service continuity may be broken. In addition, handover interruption time may be longer because IEEE 802.16e optimized and/or seamless handover procedure is inapplicable.

Figure 15:
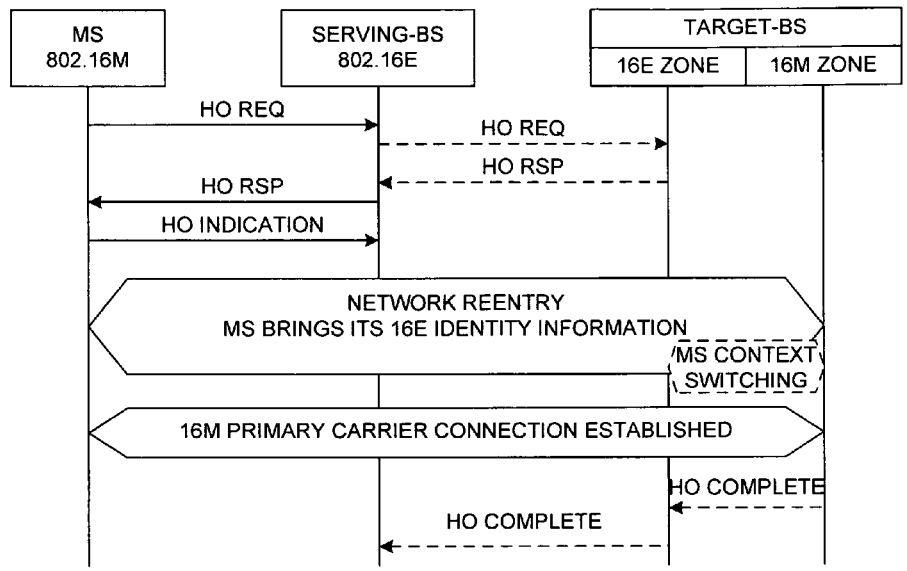
FIG. 15 is a more detailed sequence chart of a first embodiment of direct handover via IEEE 802.16m.

FIG. 15 is a more detailed sequence chart of a first embodiment of direct handover via IEEE 802.16m. In the example of FIG. 15, the serving BS forwards a handover request received from the mobile station to the 802.16e module of the target BS, and then forwards a handover response received from the target BS back to the mobile station through backend signaling. After receiving the handover response, the mobile station sends a handover indication and disconnects service from the serving BS. The mobile station then performs network reentry with the 802.16m module of the target base station. In one novel aspect, in order to distinguish such direct handover from other types of handover procedure, the mobile station identifies itself with IEEE 802.16e identity information, such as a handover ID or a MAC address, to meet a direct-switch condition for context switching. Upon receiving the identity information and detecting the direct-switch condition, the 802.16m module of the target BS may also retrieve other related information of the mobile station to optimize the handover procedure. Note that ASN gateway forwards the information of the mobile station from serving base station to target base station before MS conducts network reentry procedure with the target base station. It is also noted that, 802.16m standard is evolved from 802.16e standard. There are some commonalities existing in equipment capabilities and configurations. Therefore, the information retrieving between 16e and 16m modules can reduce the message volume transmitted over the air interface.

Figure 16:
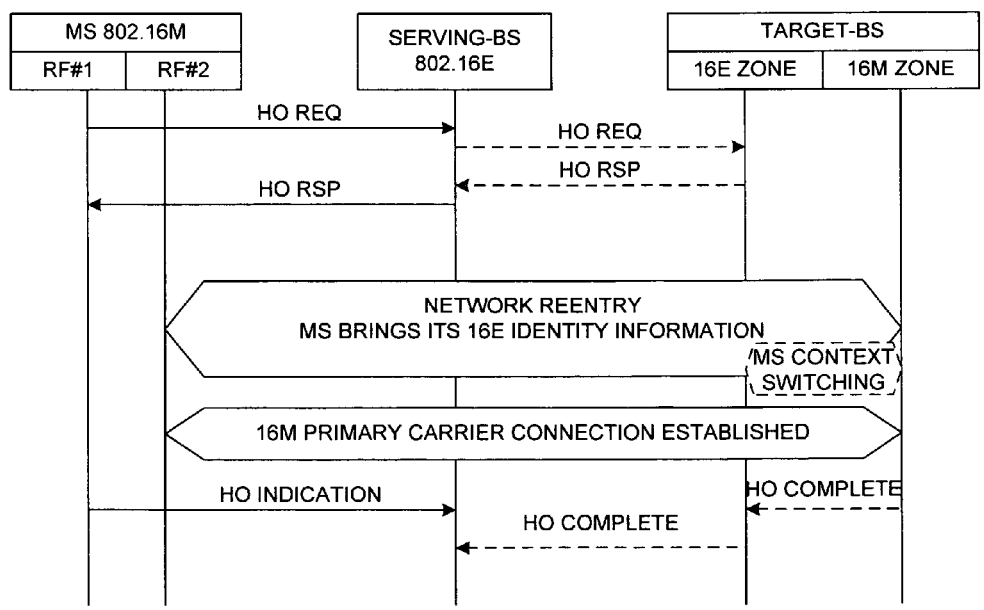
FIG. 16 is a more detailed sequence chart of a second embodiment of direct handover via 802.16m for a multi-carrier mobile station.

FIG. 16 is a more detailed sequence chart of a second embodiment of direct handover via IEEE 802.16m for a multi-carrier mobile station. In the example of FIG. 16, the mobile station supports two RF carriers, a primary carrier RF#1 and a secondary carrier RF#2. The mobile station uses the secondary carrier RF#2 to perform direct handover procedure, while maintaining data communication with the serving BS using the primary carrier RF#1. After network reentry is done and a new data path has been established with the 802.16m module of the target BS, the mobile station may send a handover indication and disconnect service from the serving BS at that time. By utilizing both RF carriers, the mobile station is able to maintain data communication throughout the direct handover procedure.

Although the present invention has been described in connection with certain specific embodiments for instructional purposes, the present invention is not limited thereto. For example, the serving base station BS11 in FIG. 1 and FIG. 2 may not be an IEEE 802.16e-only base station. Instead, BS11 may be an IEEE 802.16e/16m-coexistence base station. Similarly, the mobile station MS14 in FIG. 1 and FIG. 2 may not be an IEEE 802.16m mobile station. Instead, MS14 may also be an IEEE 802.16e/16m-coexistence mobile station. Accordingly, various modifications, adaptations, and combinations of various features of the described embodiments can be practiced without departing from the scope of the invention as set forth in the claims.

What is claimed is:

1. A method for handover in a wireless network supporting both IEEE 802.16e zone and IEEE 802.16m zone, the method comprising:
   scanning neighboring cells by a mobile station, wherein the mobile station is served by an IEEE 802.16e-only serving base station or by an IEEE 802.16e zone of an IEEE 802.16e/16m-coexistence serving base station;
   performing an IEEE 802.16e handover procedure such that the mobile station handovers from the serving base station to an IEEE 802.16e zone of a target base station, wherein the mobile station is indicated with IEEE 802.16e and IEEE 802.16m coexistence capability of the target base station by reading a reserved bit in a Frame Control Header (FCH), and wherein the mobile station further obtains IEEE 802.16m Superframe Header (SFH) information of an IEEE 802.16m zone of the target base station; and
   performing a zone-switch procedure such that the mobile station switches from the IEEE 802.16e zone of the target base station to the IEEE 802.16m zone of the same target base station.

2. The method of claim 1, wherein the scanning is based on neighboring cell information obtained from the serving base station.

3. The method of claim 1, wherein the scanning involves reading the FCH broadcasted by the target base station, and wherein the reserved bit in the FCH is used to indicate IEEE 802.16e and IEEE 802.16m coexistence capability of the target base station.

4. The method of claim 3, further comprising:
   reporting scanning result containing a number of neighboring cells with the coexistence capability to the serving base station so that the mobile station handovers to one of the reported neighboring cells with coexistence capability.

5. The method of claim 3, wherein the mobile station initiates the zone-switch procedure when the FCH indicates the coexistence capability.

6. The method of claim 1, wherein the IEEE 802.16e handover procedure involves sending a ranging request message to the IEEE 802.16e zone of the target base station.

7. The method of claim 6, wherein the target base station initiates the zone-switch procedure when the ranging request message comprises a MAC version that indicates IEEE 802.16m capability of the mobile station.

8. The method of claim 1, wherein the zone-switch procedure is triggered during the IEEE 802.16e handover procedure.

9. The method of claim 1, wherein the zone-switch procedure is triggered after the IEEE 802.16e handover procedure.

10. A method for handover in a wireless network supporting both IEEE 802.16e zone and IEEE 802.16m zone, the method comprising:
   indicating IEEE 802.16e and IEEE 802.16m coexistence capability to a mobile station by a target base station by broadcasting a Frame Control Header (FCH), wherein the coexistence capability is indicated by a reserved bit in the FCH, wherein the mobile station is served by an IEEE 802.16e-only serving base station or by an IEEE 802.16e zone of an IEEE 802.16e/16m-coexistence serving base station, and wherein the target base station comprises an IEEE 802.16e module and an IEEE 802.16m module and broadcasts IEEE 802.16m Superframe Header (SFH) information of an IEEE 802.16m zone of the target base station;
   performing an IEEE 802.16e handover procedure to handover the mobile station from the serving base station to an IEEE 802.16e zone of the target base station; and
   performing a zone-switch procedure to switch the mobile station from the IEEE 802.16e zone of the target base station to the IEEE 802.16m zone of the same target base station.

11. The method of claim 10, wherein the IEEE 802.16m module of the target base station retrieves 802.16e and 802.16m common information of the mobile station from the IEEE 802.16e module of the target base station such that the zone-switch procedure is optimized.

12. The method of claim 10, wherein the mobile station initiates the zone-switch procedure by sending a message with zone-switch indication to the target base station.

13. The method of claim 10, wherein the target base station initiates the zone-switch procedure by sending a message with zone-switch to the mobile station.

14. The method of claim 10, wherein the zone-switch procedure is triggered during the IEEE 802.16e handover procedure.

15. The method of claim 10, wherein the zone-switch procedure is triggered after the IEEE 802.16e handover procedure.

16. A method for handover in a wireless network, the method comprising:
   scanning neighboring cells by a mobile station, wherein the mobile station is served by an IEEE 802.16e-only serving base station or by an IEEE 802.16e zone of an IEEE 802.16e/16m-coexistence serving base station;
   obtaining IEEE 802.16m superframe header (SFH) information of an IEEE 802.16m zone of a target base station, wherein the mobile station is indicated with IEEE 802.16e and IEEE 802.16m coexistence capability of the target base station by reading a reserved bit in a Frame Control Header (FCH) during the scanning; and
   performing an IEEE 802.16m handover procedure such that the mobile station handovers from the serving base station to an IEEE 802.16m zone of the target base station directly.

17. The method of claim 16, wherein the mobile station identifies itself with IEEE 802.16e identity information to the IEEE 802.16m zone of the target base station.

18. The method of claim 17, wherein the IEEE 802.16e identity information comprises at least one of a handover ID and/or a MAC address of the mobile station.

19. The method of claim 16, wherein the mobile station performs network reentry to the IEEE 802.16m zone of the target base station via a secondary radio frequency carrier, and wherein the mobile station maintains data communication with the serving base station via a primary radio frequency carrier until the network reentry is completed.

20. A method for handover in a wireless network, the method comprising:
   indicating IEEE 802.16e and IEEE 802.16m coexistence capability to a mobile station by a target base station by broadcasting a Frame Control Header (FCH), wherein the coexistence capability is indicated by a reserved bit in the FCH;
   broadcasting IEEE 802.16m Superframe Header (SFH) information of an IEEE 802.16m zone of the target base station to the mobile station served by an IEEE 802.16e-only serving base station or by an IEEE 802.16e zone of an IEEE 802.16e/16m-coexistence serving base station, wherein the target base station comprises an IEEE 802.16e module and an IEEE 802.16m module; and
   performing an IEEE 802.16m handover procedure upon detecting a direct-switch condition to handover the mobile station from the serving base station to an IEEE 802.16m zone of the target base station directly.

21. The method of claim 20, wherein the IEEE 802.16m module of the target base station retrieves information of the mobile station from the IEEE 802.16e module of the target base station to reduce an IEEE 802.16m handover interruption time.

22. The method of claim 20, wherein the direct-switch condition is detected when the target base station receives IEEE 802.16e identity information of the mobile station.

23. The method of claim 22, wherein the IEEE 802.16e identity information comprises at least one of a handover ID and/or a MAC address of the mobile station.

24. A method for handover in a wireless network supporting both IEEE 802.16e zone and IEEE 802.16m zone, the method comprising:
   scanning neighboring cells by a mobile station, wherein the mobile station is served by an IEEE 802.16e-only serving base station or an IEEE 802.16e zone of an IEEE 802.16e/16m-coexistence serving base station; and
   reporting the scanning results to the serving base station such that the mobile station handovers to a target base station with IEEE 802.16e and IEEE 802.16m coexistence capability, wherein the scanning results comprises only neighboring cells that have IEEE 802.16e and IEEE 802.16m coexistence capability, wherein the mobile station is indicated with IEEE 802.16e and IEEE 802.16m coexistence capability of the target base station by reading a reserved bit in a Frame Control Header (FCH) during the scanning, and wherein the mobile station further obtains IEEE 802.16m Superframe Header (SFH) information of an IEEE 802.16m zone of the target base station.

* * * * *